(12) United States Patent
Bourgault et al.

(10) Patent No.: US 10,145,571 B2
(45) Date of Patent: Dec. 4, 2018

(54) DESICCANT DRYING SYSTEM

(71) Applicant: DRYAIR MANUFACTURING CORP., St. Brieux (CA)

(72) Inventors: Claude Bourgault, St. Brieux (CA); Grant Blandin, Melfort (CA)

(73) Assignee: DRYAIR MANUFACTURING CORP., St. Brieux (CA)

( * ) Notice: Subject to any disclaimer, the term of this patent is extended or adjusted under 35 U.S.C. 154(b) by 147 days.

(21) Appl. No.: 15/435,426

(22) Filed: Feb. 17, 2017

(65) Prior Publication Data

US 2018/0045422 A1 Feb. 15, 2018

(30) Foreign Application Priority Data

Aug. 12, 2016 (CA) .................................. 2946267

(51) Int. Cl.

| | |
|---|---|
| *B01D 53/06* | (2006.01) |
| *B01D 53/26* | (2006.01) |
| *F24F 3/14* | (2006.01) |
| *B01D 53/04* | (2006.01) |
| *F24F 11/30* | (2018.01) |
| *F24F 110/20* | (2018.01) |
| *B01D 53/30* | (2006.01) |

(52) U.S. Cl.
CPC ........ *F24F 3/1423* (2013.01); *B01D 53/0454* (2013.01); *B01D 53/06* (2013.01); *B01D 53/261* (2013.01); *F24F 11/30* (2018.01); *B01D 53/30* (2013.01); *B01D 2259/4009* (2013.01); *F24F 2110/20* (2018.01); *F24F 2203/1032* (2013.01)

(58) Field of Classification Search
CPC ...... B01D 53/06; B01D 53/261; B01D 53/30; B01D 53/0454; B01D 2259/40009; F24F 3/1423; F24F 2203/1032; F24F 11/30; F24F 2110/20
USPC ...... 95/10, 113, 123; 96/111, 121, 125, 126, 96/146; 34/80, 472, 473
See application file for complete search history.

(56) References Cited

U.S. PATENT DOCUMENTS

| | | | |
|---|---|---|---|
| 5,385,603 A * | 1/1995 | Sienack | B01D 53/261 96/125 |
| 6,083,300 A * | 7/2000 | McFadden | F24F 3/1411 95/113 |
| 6,652,628 B1 | 11/2003 | Hess | |
| 7,243,442 B2 | 7/2007 | Myerholtz et al. | |

(Continued)

*Primary Examiner* — Frank M Lawrence, Jr.
(74) *Attorney, Agent, or Firm* — King & Schickli, PLLC

(57) ABSTRACT

A system for drying first and second enclosures includes first and second drying units, each drying unit including a process air stream moving through a process chamber, a reactivation air stream moving through a reactivation chamber and a rotating desiccant wheel configured such that a process wheel portion is located such that the process air stream moves therethrough, and such that a reactivation wheel portion is located such that the reactivation air stream moves therethrough. The reactivation air stream passes through a heating coil before passing through the reactivation wheel. A liquid heating unit circulates first and second heated liquid flows through the heating coils of the corresponding first and second drying units located respectively to dry the first and second enclosures. A flow control is operative to adjust a volume of the first and second heated liquid flows.

20 Claims, 2 Drawing Sheets

(56) References Cited

U.S. PATENT DOCUMENTS

| | | | |
|---|---|---|---|
| 2011/0239867 A1* | 10/2011 | Matsuba | F24F 3/1423 96/143 |
| 2012/0132070 A1* | 5/2012 | Matsuba | B01D 53/06 95/10 |
| 2013/0025450 A1* | 1/2013 | Sharma | B01D 53/06 95/113 |

* cited by examiner

DESICCANT DRYING SYSTEM

This disclosure relates to the field of equipment for drying interior spaces and in particular a system using a desiccant wheel.

BACKGROUND

It is often necessary to dry enclosures such as the interior of buildings, for example after flooding or to dry out new construction. It is known for example that raising the temperature of air reduces the relative humidity of air. Systems are know which draw outside air through a heater to reduce the relative humidity thereof, and direct the dried air stream into an enclosure at one end thereof and exhausting the air stream at the opposite end thereof. As the air stream moves through the enclosure it absorbs moisture that is carried out with the exhausted air stream. The operation of such a system is described for example in U.S. Pat. No. 7,243,442 to Myerholtz et al.

Another popular type of drying system uses a desiccant wheel, such as the mobile desiccant dehumidifier as described in U.S. Pat. No. 6,652,628 to Hess. A wheel is filled with a desiccant such as silica gel or the like, and turns slowly. Moist process air is passed through the thickness of a first process portion of the wheel and as the process air passes through the wheel moisture is drawn out of the process air and into the desiccant, and a dry air stream is discharged into the enclosure. A warmed reactivating air stream, with consequently reduced relative humidity as described above, is then passed through a second reactivating portion of the wheel and draws moisture out of the desiccant, and a wet exhaust air stream is then exhausted outside. Thus the desiccant in the slow turning desiccant wheel absorbs moisture from the process air stream flowing into the enclosure and then transfers that moisture to the reactivating air stream flowing to the outside.

SUMMARY OF THE INVENTION

The present disclosure provides a system for drying enclosures that overcomes problems in the prior art.

In a first embodiment the present disclosure provides a system for drying first and second enclosures. The system comprises first and second drying units, each drying unit comprising a process chamber and a process fan operative to produce a process air stream moving through the process chamber from an input end of the process chamber to an output end thereof, and a reactivation chamber with a reactivation fan operative to produce a reactivation air stream moving through the reactivation chamber from an input end of the reactivation chamber to an output end thereof. Seals are operative to substantially prevent air flow between the process and reactivation chambers. In each drying unit a desiccant wheel is configured such that a process portion thereof is located such that the process air stream moves through the process portion of the desiccant wheel, and such that a reactivation portion thereof is located in the reactivation chamber and the reactivation air stream moves through the reactivation portion of the desiccant wheel, and a drive is operative to rotate the desiccant wheel. A heating coil is located such that the reactivation air stream passes through the heating coil before passing through the reactivation portion of the desiccant wheel. A liquid heating unit is operative to heat a liquid and to circulate a first heated liquid flow through the heating coil of the first drying unit located in the first enclosure, and to circulate a second heated liquid flow through the heating coil of the second drying unit located in the second enclosure, and a flow control is operative to adjust a volume of the first and second heated liquid flows.

In a second embodiment the present disclosure provides a method of drying first and second enclosures. The method comprises positioning a first drying unit to dry the first enclosure and positioning a second drying unit to dry the second enclosure, where each drying unit comprises a process chamber and a process fan operative to produce a process air stream moving through the process chamber from an input end of the process chamber to an output end thereof; a reactivation chamber and a reactivation fan operative to produce a reactivation air stream moving through the reactivation chamber from an input end of the reactivation chamber to an output end thereof; seals operative to substantially prevent air flow between the process and reactivation chambers; a desiccant wheel configured such that a process portion thereof is located such that the process air stream moves through the process portion of the desiccant wheel, and such that a reactivation portion thereof is located in the reactivation chamber and the reactivation air stream moves through the reactivation portion of the desiccant wheel; a drive operative to rotate the desiccant wheel; and a heating coil located such that the reactivation air stream passes through the heating coil before passing through the reactivation portion of the desiccant wheel. The method further comprises activating the process and reactivation fans to produce the corresponding process and reactivation air streams and activating the drive to rotate the desiccant wheel; activating a liquid heating unit located outside the first and second enclosures and circulating a first heated liquid flow from the liquid heating unit through the heating coil of the first drying unit, and circulating a second heated liquid flow from the liquid heating unit through the heating coil of the second drying unit; directing the process air stream from the output end of the process chamber of each of the first and second drying units into the corresponding first and second enclosures; and directing the reactivation air stream from the output end of the reactivation chamber of each of the first and second drying units out of the corresponding first and second enclosures.

The present disclosure provides a system for efficient drying of a plurality of enclosures of differing sizes and degrees of wetness with a single heating unit. The system operates at a relatively low temperature such that occupied buildings can be dried without excessive discomfort to the occupants. The liquid heating unit is typically mounted on a trailer with a plurality of drying units, coils of supply and return conduits and the like conveniently positioned for removal and replacement.

Heated liquid can be circulated a considerable distance with a relatively small pump, allowing the drying units to be located in enclosures several hundred feet apart if desired. Once the drying units are in place, with heat circulating in the heating coils, it is only required to move air a short distance through each of the process and reactivation chambers and into or out of the enclosure, depending on whether the drying unit is inside the enclosure or beside it. In comparison moving heat with air any significant distance requires large blowers and considerable energy.

Using a remote liquid heating unit also allows the drying units to be placed inside an enclosure if desired, without concerns about fire hazard, combustion gas exhausts, and the like which are present with direct fired drying units. Electrically powered heating coils are typically powered by diesel generators, since the large quantities of electric energy required are typically not readily available for temporary use in many situations. Diesel electrical generation is not only a much less efficient way to produce heat, but using electrical equipment in wet environments presents hazards as well.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
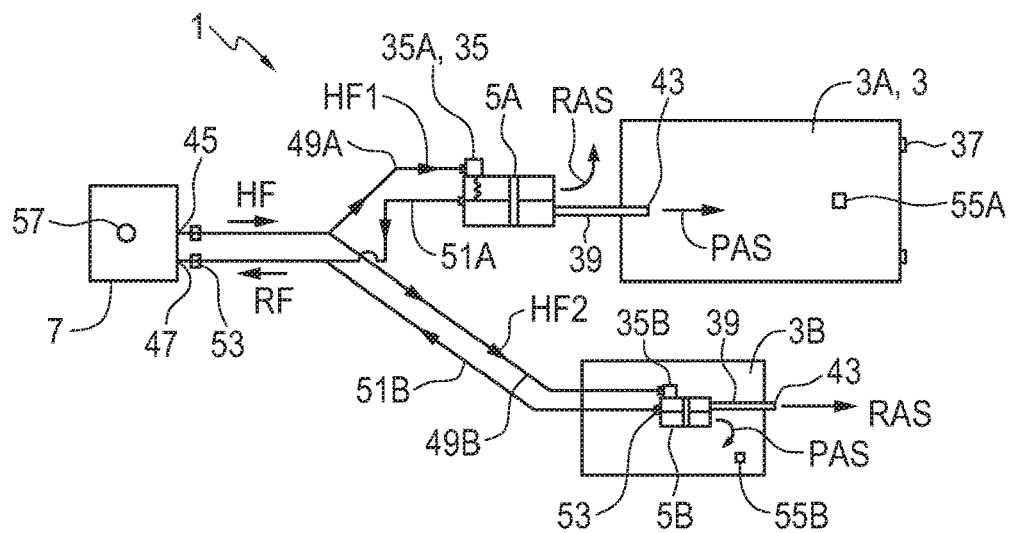
FIG. 1 is a schematic top view of an embodiment of the system of the present disclosure for drying first and second enclosures.

FIG. 1 schematically illustrates an embodiment of a system 1 of the present disclosure for drying first and second enclosures 3A, 3B. The system comprises first and second drying units 5A, 5B connected to a liquid heating unit 7.

Figure 2:
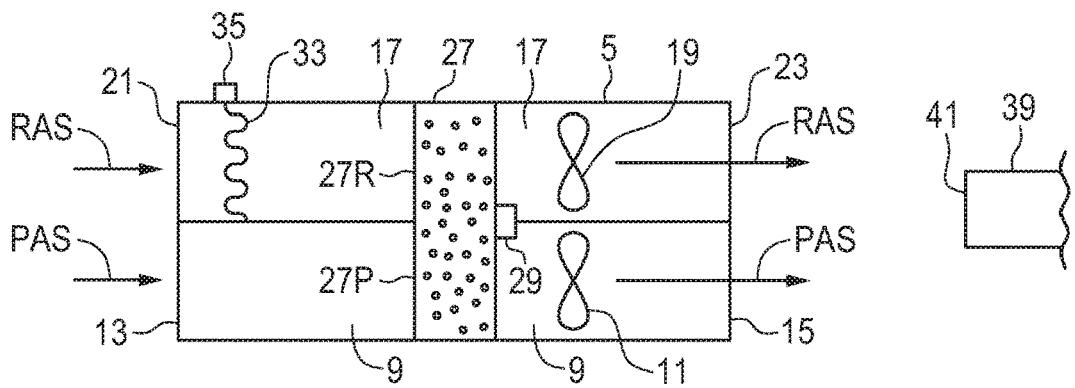
FIG. 2 is a schematic sectional side view of the drying units of the embodiment of FIG. 1.
Figure 3:
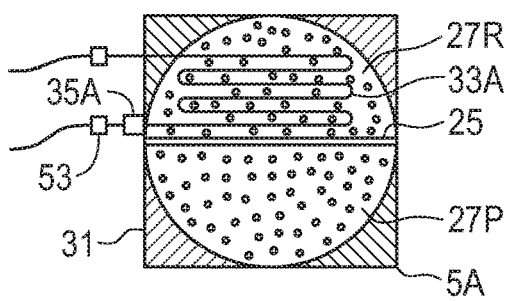
FIG. 3 is a schematic sectional end view of the larger drying unit of the embodiment of FIG. 1.

As schematically illustrated in FIGS. 2 and 3 each drying unit comprised a process chamber 9 and a process fan 11 operative to produce a process air stream PAS moving through the process chamber 9 from an input end 13 of the process chamber 9 to an output end 15 thereof, and a reactivation chamber 17 and a reactivation fan 19 operative to produce a reactivation air stream RAS moving through the reactivation chamber 17 from an input end 21 of the reactivation chamber 17 to an output end 23. Seals 25 are operative to substantially prevent air flow between the process and reactivation chambers 9, 17.

A desiccant wheel 27 is configured such that a process portion 27P thereof is located such that the process air stream PAS moves through the process portion 27P of the desiccant wheel 27, and such that a reactivation portion 27R thereof is located in the reactivation chamber 17 and the reactivation air stream RAS moves through the reactivation portion 27R of the desiccant wheel 27. A drive 29 is operative to rotate the desiccant wheel 27 at a slow speed of typically about 0.25-2.0 revolutions per hour. Such desiccant wheels 27 are typically mounted in a square housing 31 as seen in FIG. 3 for ease of installation.

A heating coil 33 is located such that the reactivation air stream RAS passes through the heating coil 33 before passing through the reactivation portion 27R of the desiccant wheel 27.

The liquid heating unit 7 is operative to heat a liquid, typically a water glycol mixture, or pure glycol if a higher liquid temperature is desired, and to circulate a first heated liquid flow HF1 through the heating coil 33 of the first drying unit 5A located outside the first enclosure 3A to dry the first enclosure 3A, and to circulate a second heated liquid flow HF1 through the heating coil 33 of the second drying unit 5B located inside the second enclosure 3B to dry the second enclosure 3B. A flow control, here illustrated as modulating valves 35A, 35B mounted on the first and second drying units 5A, 5B and operative to adjust a volume of the first and second heated liquid flows HF1, HF2.

In the drying unit 5 schematically illustrated in FIGS. 2 and 3, the process portion 27P of the desiccant wheel 27 is located inside the process chamber 9 between the input and output ends 13, 15 thereof, and the heating coil 33 is located in the reactivation chamber 17 between the input end 19 thereof and the reactivation portion 27R of the desiccant wheel 27.

In the drying unit 5 the process air stream PAS is drawn into the input end 13 of the process chamber 9, and passes through the process portion 27P of the desiccant wheel 27 where moisture is removed from the process air stream, such that the process air stream PAS leaving the output end 15 of the process chamber 9 has a much reduced relative humidity compared to the process air stream PAS entering the input end of the process chamber 9, and the process air stream is directed into the corresponding enclosure 3. Moist air inside the enclosure 3 is pushed out either through vents 37, or in a typical building or room, the interior is slightly pressurized by the incoming process air stream PAS and the moist air moves out through door and window seals, and like passages.

The reactivation air stream RAS is drawn into the input end 21 of the reactivation chamber 17, and passes through the heating coil 33 which raises the temperature of the reactivation air stream RAS and correspondingly lowers the relative humidity of the reactivation air stream RAS such that as the relatively dry reactivation air stream RAS same passes through the reactivation portion 27R of the desiccant wheel 27, moisture is drawn from the reactivation portion 27R of the desiccant wheel 27 into the reactivation air stream RAS and the relative humidity of reactivation air stream RAS increases and the reactivation portion 27R of the desiccant wheel 27 is dried.

The first drying unit 5A is positioned beside the first enclosure 3A and the dry process air stream PAS from the output end of the process chamber is directed into the first enclosure 3A, and the reactivation air stream RAS is exhausted outside the first enclosure 3A. The second drying unit 5B is positioned inside the second enclosure 3B and the reactivation air stream RAS from the output end of the reactivation chamber is directed out of the second enclosure while the dry process air stream PAS from the output end of the process chamber is directed into the second enclosure 3B.

A typical system 1 of the present disclosure will include an air conduit 39 with an air input end 41 thereof adapted to be connected to both the output end 23 of the reactivation chamber 17 and the output end 15 of the process chamber 9, and an air output end 43 so that the air output end 43 can be placed either inside or outside the corresponding enclosure depending on the situation.

Figure 5:
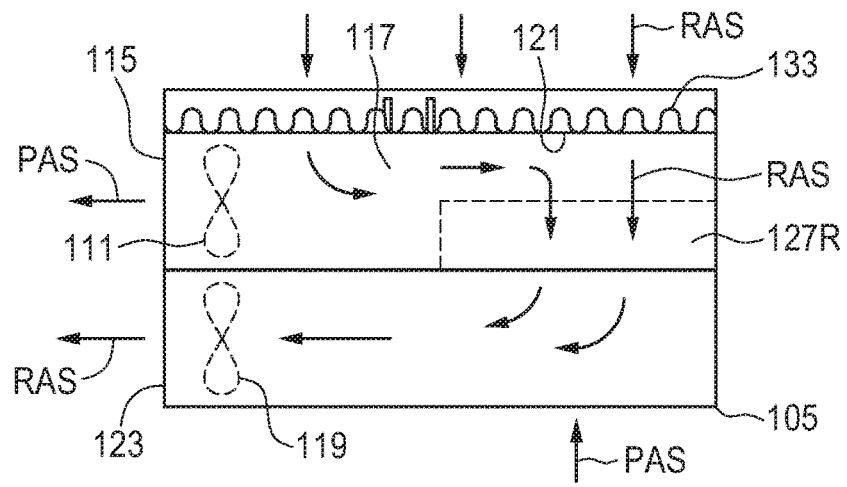
FIG. 5 is a schematic top view of an alternate drying unit for use with the system of present disclosure.
Figure 6:
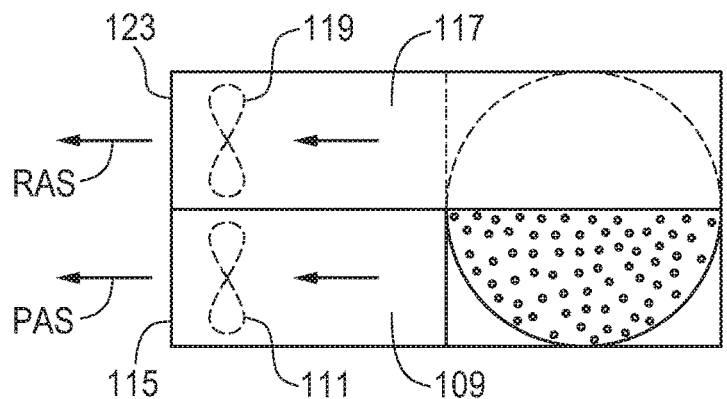
FIG. 6 is a schematic side view of the alternate drying unit of FIG. 5.
Figure 7:
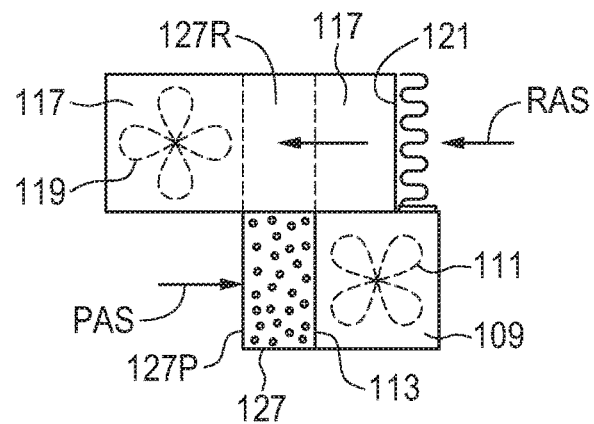
FIG. 7 is a schematic end view of the alternate drying unit of FIG. 5.

FIGS. 5-7 schematically illustrate an alternate drying unit 105 where the process portion 127P of the desiccant wheel 127 is located outside the process chamber 109 at the input end 113 thereof such that the process air stream PAS is drawn through the process portion 127P of the desiccant wheel 127. In the drying unit 105 the heating coil 133 is also located outside the reactivation chamber 117 at the input end 121 thereof such that the reactivation air stream RAS is drawn through the heating coil 133 prior to passing through the reactivation portion of the desiccant wheel 127. The process fan 111 is located near the output end 115 of the process chamber 109 and similarly the reactivation fan 119 is located near the output end 123 of the reactivation chamber 117.

In the alternate drying unit 105 the heating coil 133 is quite large covering substantially the whole length of the drying unit 105. With the liquid heating unit 7 of the present disclosure, the temperature of the circulating heating fluid is limited to near the boiling point of the liquid. The large surface area of the heating coil 133 that is made possible by the configuration of the drying unit 105 allows a large quantity of heat to be added to the reactivation air stream RAS to raise the temperature of the reactivation air stream RAS passing through the reactivation portion 27R, 127R of the desiccant wheel 27, 127 to about 180 degrees F., or somewhere under 200 degrees F. It can also be seen that in the illustrated drying units 5, 105 the process portion 27P, 127P of the desiccant wheel 27, 127 is substantially the same size as the reactivation portion 27R, 127R of the desiccant wheel.

In contrast in prior art systems with electrically powered heating coils the temperature of the reactivation air stream RAS is often around 300 degrees F., and at these high temperatures the reactivation air stream RAS is very dry and the reactivation portion of the desiccant wheel may only be about 25% of the desiccant wheel rather than the 50% shown in the present disclosure. The reactivation portion of the desiccant wheel is heated to about the same temperature as the reactivation air stream RAS, and this heat is conducted as well to the process portion of the desiccant wheel. The increased temperature of the desiccant wheel thus increases the temperature of the process air stream PAS to a level which is uncomfortably high for drying occupied buildings, such that secondary cooling is often required when drying occupied buildings. The lower temperature but higher desiccant wheel surface area of the present disclosure reduces the need for cooling.

In the illustrated system 1 the liquid heating unit 7 is operative to dispense a heated liquid flow HF from an output port 45 thereof, and to receive a return liquid flow RF through an input port 47 thereof. The liquid heating unit 7 will typically include an impeller type pump operative to dispense a variable flow volume depending on the back pressure downstream. Sufficient volume will be provided to provide for the contemplated number of drying units, size of heating coils etc. that will be used in conjunction with the liquid heating unit 7.

First supply and return conduits 49A, 51A connect the liquid heating unit 7 to the heating coil of the first drying unit 5A, and second supply and return conduits 49B, 51B connect the liquid heating unit 7 to the heating coil of the second drying unit 5B. To facilitate setting up and taking down the system 1 at a work location the first and second supply and return conduits 49, 51 are conveniently connected at each end thereof by releasable quick connectors 53

In the system 1, a first humidity sensor 55A is operative to determine a first relative humidity in the first enclosure 3A, and the flow control provided by first modulating valve 35A is operative to reduce the volume of the first heated liquid flow HF1 when the first relative humidity falls to a selected low level, indicating that a desired "dryness" has been attained in the first enclosure 3A. Reducing the volume of the first heated liquid flow HF1 through the heating coli 33 of the first drying unit 5A reduces the heat transferred to the reactivation air stream RAS and thus reduces the temperature of the reactivation air stream RAS, and increases the relative humidity thereof with the result that less moisture is drawn from the reactivation portion 27R of the desiccant wheel 27, and the relative humidity of the process air stream PAS correspondingly rises.

In the illustrated system 1 the flow control is provided by first and second modulating valves 35A, 35B mounted on the corresponding first and second drying units 5A, 5B, each operative to receive humidity level information from corresponding first and second humidity sensors and to adjust the volume of the corresponding first and second heated liquid flows HF1, HF2 in response to the humidity level information received from first and second relative humidity sensors 55A, 55B.

Over-drying an enclosure can cause cracks in walls and like damage, and so control of the relative humidity in the enclosures 3 is beneficial for preventing damage. Similarly it is known that the relative humidity in the enclosures 3 may rise after the heated liquid flows to the heating coils 33 is reduced and so typically the modulating valves 35A, 35B are operative to increase the volume of the heated liquid flow to the corresponding heating coil 33 when the relative humidity in the corresponding enclosure 3 rises from the selected low level to a somewhat increased selected high level. Accurate relative humidity control is thus readily and simply provided by the system 1.

The first enclosure 3A is also larger than the second enclosure 3B and typically the modulating valves 35 will be adjusted so the volume of the first heated liquid flow HF1 to be greater than the volume of the second heated liquid flow HF2 to direct more heat and more drying effect to the larger enclosure 3A where more moisture must be removed. Similarly more heat can be directed to a wetter enclosure.

Figure 4:
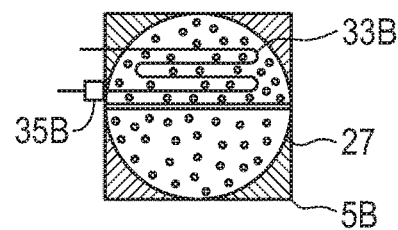
FIG. 4 is a schematic sectional end view of the smaller drying unit of the embodiment of FIG. 1.

Also the size of the drying units can vary to provide drying units suitable for different applications. As shown in FIGS. 3 and 4 the coil surface area of the heating coil 33A in the first drying unit 5A is greater than the coil surface area of the heating coil 33B in the second drying unit 5B. Also as seen in FIG. 1, the first drying unit 5A and the desiccant wheel thereof as schematically illustrated in FIG. 3, is larger than the second drying unit 5B and its desiccant wheel as schematically illustrated in FIG. 4. Typically more heated liquid will be directed to the larger drying unit 5A. A temperature control 57 may be provided to adjust a temperature of the heated output liquid flow HF.

The present disclosure provides a method of drying first and second enclosures 3A, 3B. The method comprises positioning a first drying unit 5A to dry the first enclosure 3A and positioning a second drying unit 5A to dry the second enclosure 3B. Each drying unit 5 comprises a process chamber 9 and a process fan 11 operative to produce a process air stream PAS moving through the process chamber 9 from an input end 13 of the process chamber 9 to an output end 15 thereof; a reactivation chamber 17 and a reactivation fan 19 operative to produce a reactivation air stream RAS moving through the reactivation chamber 17 from an input end 21 of the reactivation chamber to an output end 23 thereof; seals 25 operative to substantially prevent air flow between the process and reactivation chambers 9, 17; a desiccant wheel 27 configured such that a process portion 27P thereof is located such that the process air stream PAS moves through the process portion 27P of the desiccant wheel 27, and such that a reactivation portion 27R thereof is located in the reactivation chamber 17 and the reactivation air stream RAS moves through the reactivation portion 27R of the desiccant wheel; a drive 29 operative to rotate the desiccant wheel 27; and a heating coil 33 located such that the reactivation air stream RAS passes through the heating coil 33 before passing through the reactivation portion 27R of the desiccant wheel 27.

The method further comprises activating the process and reactivation fans 11, 19 to produce the corresponding process and reactivation air streams PAS, RAS and activating the drive 29 to rotate the desiccant wheel 27, activating the liquid heating unit 7 located outside the first and second enclosures 3 and circulating a first heated liquid flow HF1 from the liquid heating unit 7 through the heating coil 33 of the first drying unit 5A, and circulating a second heated liquid flow HF2 from the liquid heating unit 7 through the heating coil 33 of the second drying unit 5B; directing the process air stream from the output end of the process chamber of each of the first and second drying units into the corresponding first and second enclosures; and directing the reactivation air stream from the output end of the reactivation chamber of each of the first and second drying units out of the corresponding first and second enclosures.

The present disclosure thus provides a system for efficient drying of a plurality of enclosures of differing sizes and degrees of wetness with a single heating unit. The system operates at a relatively low temperature such that occupied buildings can be dried without excessive discomfort to the occupants. The liquid heating unit 7 is typically mounted on a trailer with a plurality of drying units 5, coils of supply and return conduits 49, 51 and the like conveniently positioned for removal and replacement.

In addition, due to the relatively low temperature of the reactivation air stream RAS, the drying unit 5, 105 can also be used as a space heater to simply heat an enclosure. The desiccant wheel 27, 127 and process fan 11, 111 can be stopped and the heated reactivation air stream RAS will simply pass through the idle desiccant wheel 27, 127, which provides relatively little resistance, and the heated reactivation air stream RAS can be directed into the enclosure by placing the drying unit in the enclosure, or by using the air conduit 39. It is contemplated that the much higher temperatures in the prior art electrical systems could damage a stationary desiccant wheel 27, 127 over a period of time.

The present disclosure also provides a simple system for monitoring and controlling the relative humidity in the enclosures 3 to prevent damage from over drying, and also to optimize drying time by adjusting the drying effect to follow the relative humidity of the enclosure as the relative humidity changes.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system for drying first and second enclosures, the system comprising:
   first and second drying units, each drying unit comprising:
      a process chamber and a process fan operative to produce a process air stream moving through the process chamber from an input end of the process chamber to an output end thereof;
      a reactivation chamber and a reactivation fan operative to produce a reactivation air stream moving through the reactivation chamber from an input end of the reactivation chamber to an output end thereof;
      seals operative to substantially prevent air flow between the process and reactivation chambers;
      a desiccant wheel configured such that a process portion thereof is located such that the process air stream moves through the process portion of the desiccant wheel, and such that a reactivation portion thereof is located in the reactivation chamber and the reactivation air stream moves through the reactivation portion of the desiccant wheel;
      a drive operative to rotate the desiccant wheel; and
      a heating coil located such that the reactivation air stream passes through the heating coil before passing through the reactivation portion of the desiccant wheel;
   a liquid heating unit operative to heat a liquid and to circulate a first heated liquid flow through the heating coil of the first drying unit located to dry the first enclosure, and to circulate a second heated liquid flow through the heating coil of the second drying unit located to dry the second enclosure;
   a flow control operative to adjust a volume of the first and second heated liquid flows.

2. The system of claim 1 wherein the process portion of the desiccant wheel is located inside the process chamber between the input and output ends thereof.

3. The system of claim 1 wherein the process portion of the desiccant wheel is located outside the process chamber at the input end thereof such that the process air stream is drawn into the process chamber through the process portion of the desiccant wheel.

4. The system of claim 1 wherein at leaste one heating coil is located in at least one reactivation chamber between the input end thereof and the reactivation portion of the desiccant wheel.

5. The system of claim 1 wherein at least one heating coil is located outside at least one reactivation chamber at the input end thereof such that the reactivation air stream is drawn into the reactivation chamber through the heating coil.

6. The system of claim 1 comprising a first humidity sensor operative to determine a first relative humidity in the first enclosure, and wherein the flow control is operative to reduce the volume of the first heated liquid flow when the first relative humidity falls to a selected low level.

7. The system of claim 6 wherein the flow control comprises a first modulating valve mounted on the first drying unit and operative to receive humidity level information from the first humidity sensor and adjust the volume of the first heated liquid flow in response to the received humidity level information.

8. The system of claim 7 wherein the first modulating valve is operative to increase the volume of the first heated liquid flow when the first relative humidity rises to a selected high level.

9. The system of claim 6 comprising a second humidity sensor operative to determine a second relative humidity in the second enclosure, and wherein the flow control comprises a second modulating valve mounted on the second drying unit and operative to receive humidity level information from the second humidity sensor and adjust the volume of the second heated liquid flow in response to the received humidity level information.

10. The system of claim 6 comprising first supply and return conduits connecting the liquid heating unit to the heating coil of the first drying unit, and second supply and return conduits connecting the liquid heating unit to the heating coil of the second drying unit, and wherein the first and second supply and return conduits are connected at each end thereof by releasable quick connectors.

11. The system of claim 6 comprising a temperature control operative to adjust a temperature of liquid flowing from the liquid heating unit.

12. The system of claim 1 wherein a first coil surface area of the heating coil in the first drying unit is greater than a second coil surface area of the heating coil in the second drying unit.

13. The system of claim 1 wherein a first wheel surface area of the desiccant wheel in the first drying unit is greater than a second wheel surface area of the desiccant wheel in the second drying unit.

14. The system of claim 1 wherein each drying unit comprises an air conduit with an air input end thereof adapted to be connected to both the output end of the reactivation chamber and the output end of the process chamber, and an air output end.

15. The system of claim 1 wherein the process portion of at least one desiccant wheel is substantially the same size as the reactivation portion of the desiccant wheel.

16. The system of claim 15 wherein a temperature of the reactivation air stream moving through the reactivation portion of the desiccant wheel is less than about 200 degrees F.

17. A method of drying first and second enclosures, the method comprising:
  positioning a first drying unit to dry the first enclosure and positioning a second drying unit to dry the second enclosure, each drying unit comprising:
    a process chamber and a process fan operative to produce a process air stream moving through the process chamber from an input end of the process chamber to an output end thereof;
    a reactivation chamber and a reactivation fan operative to produce a reactivation air stream moving through the reactivation chamber from an input end of the reactivation chamber to an output end thereof;
    seals operative to substantially prevent air flow between the process and reactivation chambers;
    a desiccant wheel configured such that a process portion thereof is located such that the process air stream moves through the process portion of the desiccant wheel, and such that a reactivation portion thereof is located in the reactivation chamber and the reactivation air stream moves through the reactivation portion of the desiccant wheel;
    a drive operative to rotate the desiccant wheel; and
    a heating coil located such that the reactivation air stream passes through the heating coil before passing through the reactivation portion of the desiccant wheel;
  activating the process and reactivation fans to produce the corresponding process and reactivation air streams and activating the drive to rotate the desiccant wheel;
  activating a liquid heating unit located outside the first and second enclosures and circulating a first heated liquid flow from the liquid heating unit through the heating coil of the first drying unit, and circulating a second heated liquid flow from the liquid heating unit through the heating coil of the second drying unit;
  directing the process air stream from the output end of the process chamber of each of the first and second drying units into the corresponding first and second enclosures; and
  directing the reactivation air stream from the output end of the reactivation chamber of each of the first and second drying units out of the corresponding first and second enclosures.

18. The method of claim 17 comprising positioning the first drying unit inside the first enclosure and directing the reactivation air stream from the output end of the reactivation chamber out of the first enclosure.

19. The method of claim 17 comprising positioning the second drying unit beside the first enclosure and directing the process air stream from the output end of the process chamber into the second enclosure.

20. The method of claim 17 comprising adjusting the volume of the first and second heated liquid flows in response to relative humidity sensed in the corresponding first and second enclosures.

* * * * *